April 22, 1969  E. F. WITTNER  3,439,784

AUTOMOBILE BRAKE AND THROTTLE CONTROLS

Filed July 24, 1967 Sheet 1 of 3

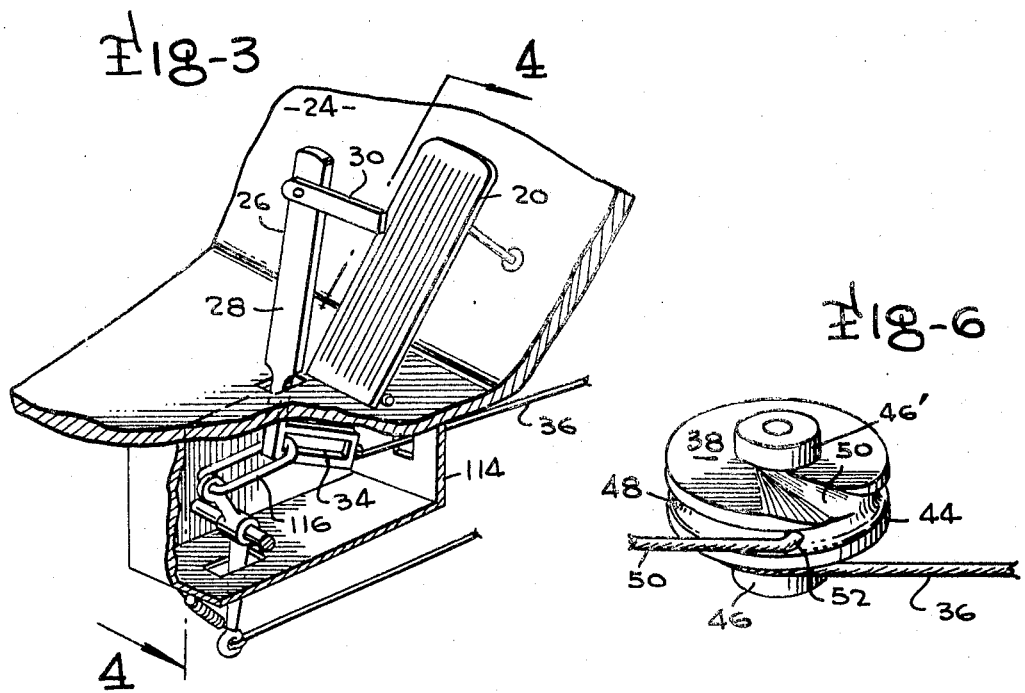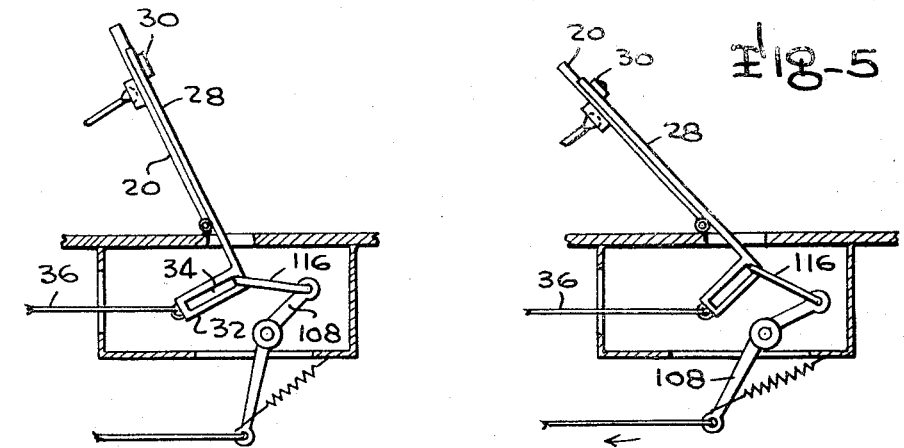

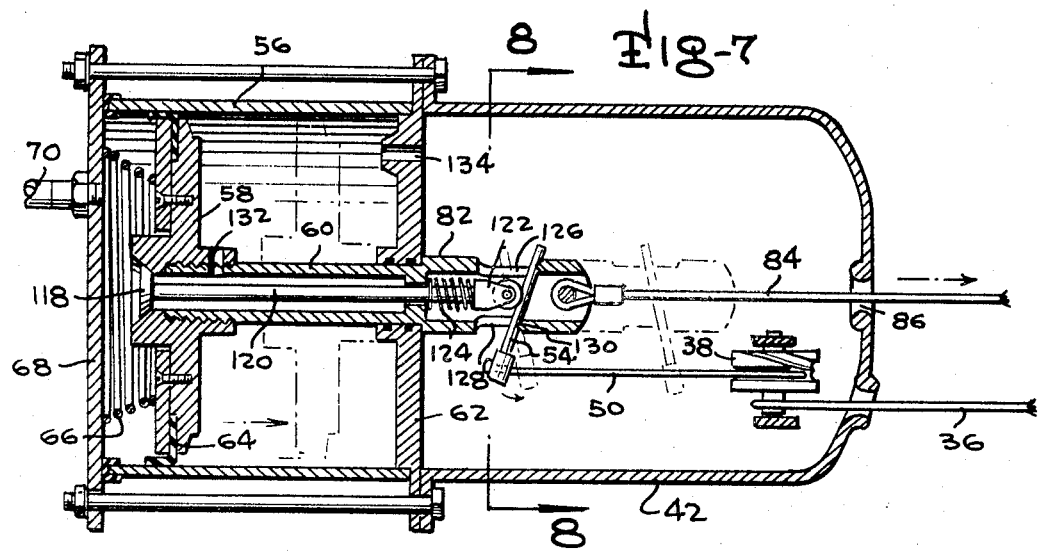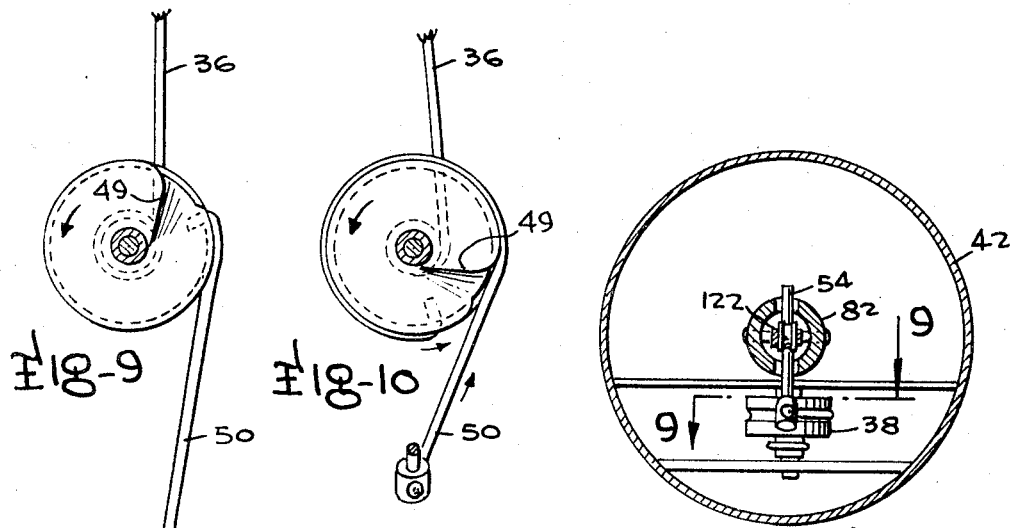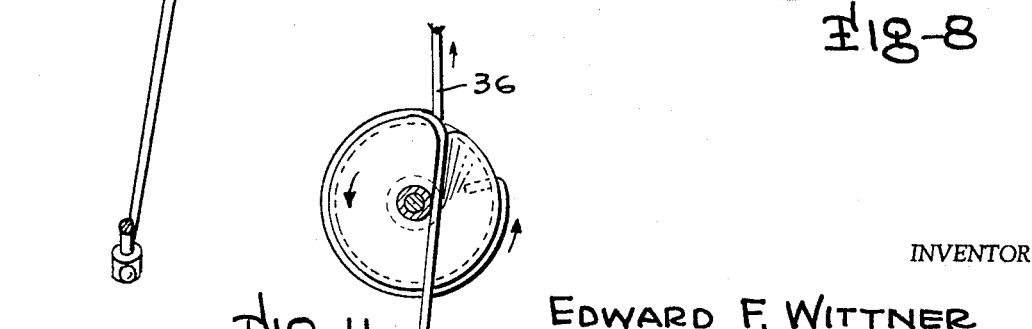

United States Patent Office 3,439,784
Patented Apr. 22, 1969

3,439,784
AUTOMOBILE BRAKE AND THROTTLE
CONTROLS
Edward F. Wittner, 421 Repton Road,
Riverside, Ill. 60546
Filed July 24, 1967, Ser. No. 655,676
Int. Cl. F16d 67/00
U.S. Cl. 192—3                             5 Claims

ABSTRACT OF THE DISCLOSURE

A brake control system having a servo-piston connected to a brake applicator and mounted in a vacuum cylinder for selective actuation by valve means connected by flexible cord through a plural diameter spool to a companion pedal associated with the automobile accelerator pedal.

BACKGROUND OF THE INVENTION

This invention relates to the field of automobile control systems, and more particularly, to brake and accelerator pedal control apparatus that can be operated either by hand or by foot to automatically actuate the automobile braking system. The invention is of particularly great value in situations wherein the same automobile is driven by both handicapped and non-handicapped persons, in that it enables either hand operation or foot operation of the brake and accelerator control system; moreover, the automatic system can be deactivated at any time so that the automobile can be driven in the normal mode of operation. Consequently, it will be readily appreciated that this invention provides unique versatility of operation.

The need for both hand operated and foot operated automatic brake and accelerator control systems has long been recognized by the automotive industry as evidenced by the abundance of patents granted in this field. However, the prior art attempts have universally suffered from the defetcs of over-complexity, unreliability, high cost and inflexibility of operation. Another serious defect of many of the prior art systems is that they require extensive modification of the automobile in which they are to be installed. Many of the prior art automatic braking and clutching systems have also been excessively tiresome to operate, due to the excessive force required for manipulating their control elements.

Great emphasis has been exerted in recent years toward increasing the acceleration and speed of motor vehicles. This fact, when coupled with the ever increasing traffic which adds to driver fatigue, has created an even greater need for safe, economical and reliable automatic braking systems. Scientific experiments have clearly demonstrated that a significantly large proportion of the time required to bring a speeding vehicle to a halt is expended in the time required for transferring the foot from the accelerator pedal to the brake pedal of the automobile. This invention provides means that greatly reduces the time for brake application since only a single movement is required for such.

Therefore, this invention meets a long standing need that has not been met by the currently known devices in the field.

SUMMARY OF THE INVENTION

It is a primary object of this invention to provide a new and improved automatic brake control system for an automobile.

It is a further object of this invention to provide a new and improved hand operated control system for an automobile.

Still another object of this invention is the provision of a new and improved automobile accelerator pedal and brake control system that can be either hand operated or foot operated.

The foregoing objects of this invention are accomplished through the provision of a companion pedal mounted adjacent the accelerator pedal of an automobile for pivotable movement in conjunction with the accelerator pedal and having a laterally extending arm engaging the top of hte accelerator pedal so that both pedals can be moved simultaneously. However, the companion pedal is capable of movement away from the accelerator pedal when the accelerator pedal is in its upper or closed throttle position. This last mentioned movement causes automatic brake application by virtue of a flexible line connection from the companion pedal through a movement reducing plural diameter spool to a control valve which, when closed, causes a piston to be actuated to move a brake actuator to apply the automatic brakes. When the valve is open, as occurs when the accelerator pedal and the companion pedal are depressed past closed throttle position, the valve is opened to enable a spring means to actuate the piston so that the brake is not applied.

An important feature of this invention is the provision of the double-diameter spool connection between the companion pedal and the control valve. The double-diameter spool provides the required movement necessary for actuating the valve with a minimum of movement of the companion pedal. The result is achieved because the companion pedal is connected by a flexible line attached to the small diameter portion of the spool whereas the valve is connected to the large diameter portion by a second flexible line element. However, the large diameter portion is provided with a drop-off portion which causes the second line element to drop to a smaller diameter portion after a given pivotal movement of the companion pedal suffiicent to deactivate the brakes so as to enable full throttle operation of the accelerator without impedance from the brake actuator means.

Another important aspect of this invention is the provision of a manual hand operated control means connected by a flexible line to the companion pedal so that the hand operated means pivots the companion pedal into engagement with the accelerator pedal to operate same. However, the hand control means allows the companion pedal to pivot away from the accelerator pedal to automatically apply the brakes. The construction employed required practically no modification of the existing automobile and can be disconnected at any time to allow for normal conventional operation of the accelerator and brake systems.

DESCRIPTION OF THE DRAWINGS

FIGURE 3 is a perspective view of the companion pedal and accelerator assembly with parts cut away for clarity;

FIGURE 4 is a sectional view taken along lines 4—4 of FIGURE 3;

FIGURE 5 is identical with FIGURE 4 but illustrates the parts in a different operative relationship;

FIGURE 6 is a perspective view of the plural diameter spool employed as a portion of the linkage between the companion pedal and the brake actuating piston assembly;

3

FIGURE 7 is a bisecting sectional view of the piston assembly of the preferred embodiment;

FIGURE 8 is a sectional view taken along lines 8—8 of FIGURE 7;

FIGURE 9 is an end view of the plural diameter spool and its associated flexible connector lines as positioned when the brake is applied;

FIGURE 10 is identical with FIGURE 9 but illustrates the respective parts in a neutral position which is assumed subsequent to the termination of a braking action as the companion pedal is depressed into contact with the accelerator pedal; and FIGURE 11 is identical with FIGURES 9 and 10 but illustrates the parts in the position assumed during full throttle acceleration.

DESCRIPTION OF THE PREFERRED EMBODIMENT

Figure 1:
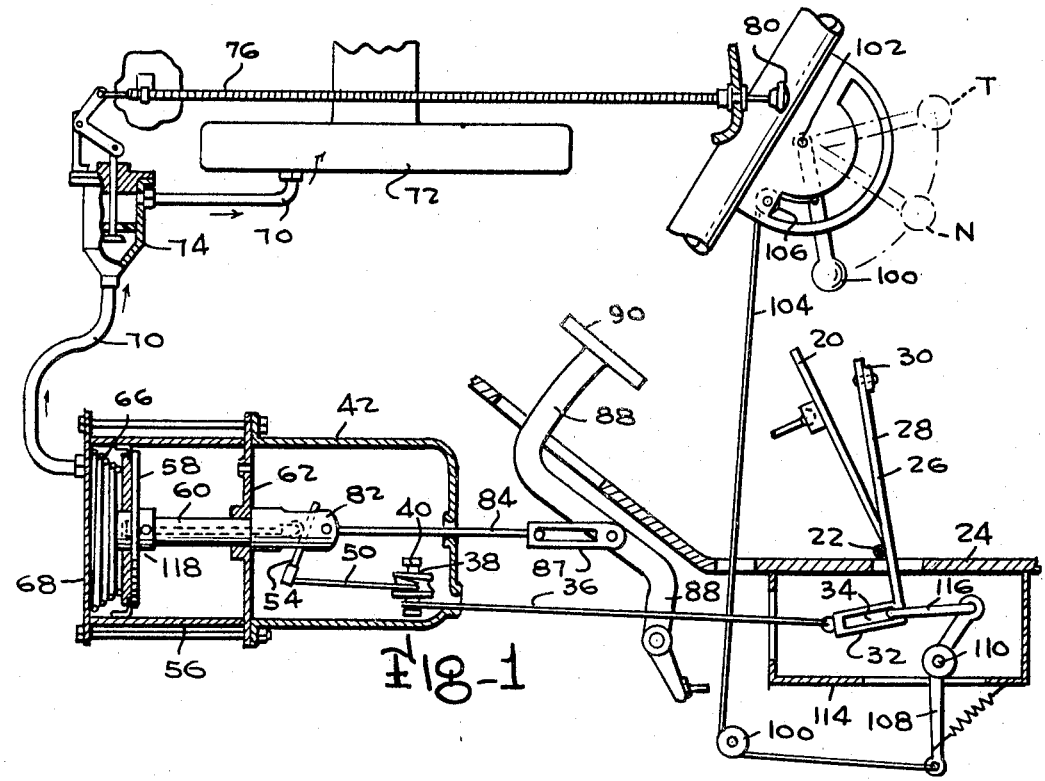
FIGURE 1 is a symbolic pictorial representation of a preferred embodiment of the invention as installed in an automobile with portions in section to more clearly illustrate the significant operative relationships.

FIGURE 1 of the drawings illustrates the preferred embodiment of the automatic control system comprising this invention. The system is shown in operative relationship with the respective automobile parts with which it is associated.

An automobile accelerator pedal 20 is mounted for pivotal movement about pivot 22 attached to the automobile floor board 24, as best illustrated in FIGURES 1 and 3. FIGURE 1 illustrates the accelerator pedal 20 in its closed throttle position. A companion pedal 26 is also mounted for pivotal movement about pivot 22 and comprises an elongated plate 28 having a lateral abutment plate 30 extending outwardly over the accelerator pedal 20. The elongated plate 28 is mounted for pivotal movement adjacent the accelerator pedal, as shown in FIGURE 3, and pivotal movement of the companion pedal downwardly towards the accelerator pedal causes the lateral abutment plate 30 to engage the accelerator pedal for further concurrent movement of both pedals. A slotted connector 32 having an elongated slot 34 extends from the lower end of the companion pedal in a direction normal to the plane of the plate 28, as illustrated in FIGURES 1 and 3. Comparison pedal 26 is movable from the position illustrated in FIGURE 1, in which it does not engage the accelerator pedal, downwardly until abutment plate 30 engages the pedal and the two pedals then move together from the closed throttle position illustrated in FIGURE 1 to the full throttle position of the accelerator pedal illustrated in FIGURE 5.

A flexible cord or line 36 is attached at one end to the outer extremity of slotted connector 32 and is attached at its outer end to a plural diameter spool 38 mounted for rotation on a shaft 40 attached to a casing cover 42. Spool 38 is formed with a large diameter central surface 44 and two small diameter surfaces 46 and 46′ flanking the central surface 44; all of the surfaces are illustrated in FIGURE 6. Cord 36 is wrapped around the small diameter surface and fastened to a radial opening therein. A spiral groove 48 extends around the perimeter of the large diameter surface and terminates in a generally radial drop-off portion 50 ending in small diameter portion 46′ which is of the same diameter as surface 46 to which line 36 is connected. A second cord or line 50 has one end attached to groove 48 at 52, as shown in FIGURE 6, and has its other end connected to a pivotable trigger pin 54 (FIG. 1), the purpose of which will be discussed hereinafter.

Turning now to FIGURE 7, it will be noted that casing cover 42 is mounted on a vacuum cylinder 56 which has a piston 58 mounted for reciprocation within its interior. A hollow piston rod 60 is connected to the piston on one end and extends through an axial port in an end wall 62 of the vacuum cylinder 56. A gasket seal means 64 is provided about the periphery of piston 58 so that the piston is in sealed engagement with the interior wall of cylinder 56 and a coil spring means 66 is mounted between piston 58 and a second end wall 68 so that piston 58 tends to be biased to the right, as illustrated in FIGURE 7.

4

A vacuum line 70 is connected to an opening in wall 68, so that vacuum from the intake manifold 72 (FIG. 1) of the automobile can be connected to the portion of the cylinder on the left side of piston 58 to tend to move the piston in a leftward direction to compress spring 66 in an obvious manner. A cut-off valve 74 is connected by linkage means 76 to a dash mounted knob 80 so that vacuum from the intake manifold can be cut off from the driver's position at any time in an obvious manner.

Referring to FIGURE 7, the portion of piston rod 60 exterior of the cylinder comprises cap 82 of larger diameter than the port in which the piston rod is passed through wall 62; consequently, cap 82 limits the extent of leftward movement possible for piston rod 60 and the associated piston 58. Cap 82 is hollow and is connected on its right-most end to a flexible line or cable 84, which passes through an opening 86 in the casing cover 42 and is connected on its other end through a lost motion 87 to a pivotable brake actuation lever 88. The pivotable brake actuator 88 is the conventional brake actuator employed in most automobiles and has a foot pedal 90 on its upper extremity, as shown in FIGURE 1. Depression of the foot pedal causes the brakes to be applied and movement of piston 58 to the left also applies the brakes in an obvious manner.

A pivotable hand control lever 100 is mounted on the automobile dash board for pivotable movement about pivot 102 and has a flexible line 104 connected to its mid portion, as shown. Line 104 is connected by means of rollers 106, etc. to a pivot lever 108 mounted for pivotal movement about pivot 110, formed in a casing 114, attached beneath floor board 24 (FIG. 1). A floating link 116 is pivoted to the upper end of lever 108 on one end and is slidably received in slot 34 on the other end.

Turning now to FIGURE 7, a poppet valve 118 is located on the left end of piston 58 and has a valve stem 120 extending through the hollow interior of piston rod 60 and terminating exteriorly of wall 62. A grooved roller assembly 122 is threaded on the end of stem 120 and compression spring 124 engages the wall 62 and the roller assembly 122 to bias the roller assembly, valve stem 120 and poppet valve 118 to the right to normally seat poppet valve 118 in its valve seat formed on the left side of piston 58. The grooved roller assembly 122 engages trigger pin 54, which extends outwardly through upper and lower slots 126 and 128, respectively, formed in cap 82. Trigger pin 54 has a groove 130 which pivots on a sharp edge formed in the right end of lower slot 128, as best illustrated in FIGURE 7. Consequently, movement of line 50 toward the right in FIGURE 7 causes trigger pin 54 to pivot against the roller assembly 122 to encompass the bias of spring 124 and move poppet valve 118 from its valve seat to open the valve. A port 132 communicates between the exterior of rod 60 and the interior of the rod and an atmospheric vent port 134 in wall 62 enables the atmosphere to enter the interior of cylinder 56 to the right of piston 58. Therefore, when pin 54 is pivoted by line 50 to open valve 118, the vacuum to the left of piston 58 is dissipated by air flowing through ports 134, 132 and out past the open valve, so that the piston moves to the right and can assume the dotted line position illustrated in FIGURE 7. Conversely, closure of valve 118 causes the vacuum to move piston to the leftward position, illustrated in FIGURE 7. In this position, line 84 acts upon the brake actuator lever 88 to cause the brakes to be applied. When the piston is in the right, or dotted line position of FIGURE 7, the brakes are not applied, since no force is exerted on the actuator lever 88 by line 84, etc.

A complete cycle of operation of the invention will now be discussed with initial attention being directed to FIGURE 1 of the drawings. The solid line position of hand operated handle 100 is the brake actuated position of the handle. When the handle is in this position, the brakes of the automobile are applied and remain applied until the handle is moved. This is true because the dimensions of line 104 and the various linkages are such that when handle 100 is in this position, trigger pin 54 is not biassed against the roller assembly to open valve 118 and consequently, piston 58 assumes the position illustrated in FIGURE 1 and line 84 exerts force on actuator 88 to apply the automobile brakes. FIGURE 7 clearly illustrates the parts of the actuator assembly in their positions assumed when the brakes are applied.

Figure 2:
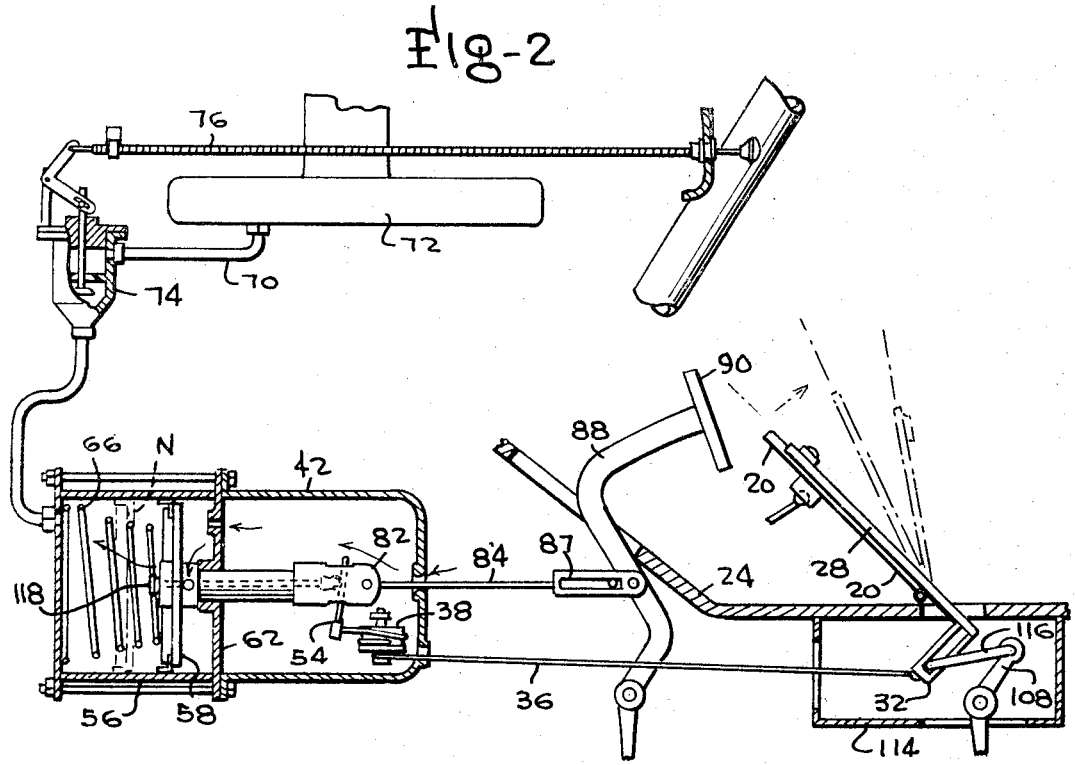
FIGURE 2 is generally the same as FIGURE 1 but illustrates the parts in a different operative position wherein the automobile brakes are not applied.

When handle 100 is moved to the dashed line or neutral position, designated N, in FIGURE 1, pivot lever 108 is pivoted in an amount necessary to cause link 116 to pivot the companion pedal 26 down to its solid line position illustrated in FIGURE 2. In this position, companion pedal 26 merely rests against generator pedal 20 and does not move it from its closed throttle position. The relative position of the accelerator pedal and the companion pedal for this condition is illustrated in FIGURE 4.

Movement of handle 100 counterclockwise past neutral position causes the companion pedal to pivot in a counterclockwise position in engagement with the accelerator pedal, so that the accelerator pedal is depressed by plate 30. Position T, illustrated in FIGURE 1, can be considered the full throttle position for the hand control handle 100. Movement of companion pedal 28 from the neutral position to a throttle position necessarily requires a slight additional movement of piston 58, which is easily accomplished by virtue of the unique construction of spool 38. The manner in which spool 38 functions will be better understood by reference to FIGURES 9 through 11, taken in conjunction with the following discussion. When the handle 100 is in its solid line position, illustrated in FIGURE 1, line 36 and line 50 assume the position illustrated in FIGURE 9. In this position, line 36 is coiled about the smaller diameter portion 46 and line 50 lies within the small groove 48. A linear movement of line 36 will produce a linear movement of line 50 in an amount four times greater than the movement of line 36. This result is brought about due to the difference in the diameter of the respective portions of spool 38 upon which the respective lines are engaged. This construction enables a small amount of pivotal movement of the companion pedal 26 to cause spool 38 to rotate to provide a substantial amount of movement of line 50. The need for this substantial mount of movement is caused by the fact that the piston will move from the solid line position to the neutral dotted line position of FIGURE 7 during movement of the companion pedal from its FIGURE 1 position to its FIGURE 2 position. However, for the piston to remain in its dashed line position, it is necessary for the trigger pin 54 to be maintained in biassing relationship against the grooved wheel assembly so that valve 118 will partially remain open. Otherwise, the vacuum would take over and move the piston back to the left. Since valve 118 must be maintained open by trigger pin 54, it is necessary that line 50 be maintained taut at all times. The additional movement imparted to line 50 by the different diameter spool relationship of spool 38 is sufficient to maintain line 50 taut during the movement of the piston from the solid to the dotted line position of FIGURE 7. However, once the piston is in this position and the accelerator pedal and the companion pedal are in the position illustrated in FIGURE 4, it is still necessary that a limited slack be provided in line 36, so that the accelerator pedal and the companion pedal can move to the full throttle position shown in FIGURE 5. For this reason, line 50 is positioned in the position illustrated in FIGURE 10, adjacent the drop-off 49 in spiral groove 48. Only a slight further counter-clockwise movement of spool 38 (caused by depression of companion pedal 28 past the neutral position to a partial throttle position) is necessary to cause the cords 36 and 50 and spool 38 to assume the position illustrated in FIGURE 11. This position enables the throttle to be completely open with only a slight additional amount of line 50 being wound upon the spool 38. This slight amount of line to be wound upon the spool is provided by an additional limited pivotal movement of trigger pin 54 which opens valve 118 a slight additional amount.

When the control handle 100 is moved from the throttle open position T to the neutral position N, the spool 38 moves from the position illustrated in FIGURE 11 to the position illustrated in FIGURE 10, and cord 50 is again in the outer diameter portion of groove 48. This results in piston 58 assuming its neutral position N illustrated in FIGURE 2 by virtue of the fact that the movement of handle 100 causes companion pedal 26 to release a small amount of cord 36 to be rolled on spool 38. The bias of spring 124 causes the trigger pin 54 to pivot from the dashed line position illustrated in FIGURE 7 to a position between the dashed line position and the solid line position. Consequently, valve 118 is partially closed and piston 58 moves to the left to the intermediate or neutral position N of FIGURE 2. However, it should be noted that the leftward movement of the piston causes trigger pin 54 to pivot slightly counterclockwise to slightly open valve 118 so that a balance is reached so that the amount of vacuum on the left side of the piston exactly equals the compressive force of spring 66 to maintain the piston in the intermediate position.

If it is desired to apply the brakes, the handle 100 will be moved past position N to its solid line position. This movement enables additional slack to be applied to line 36, so that valve 118 is closed and the vacuum is fully effective to move piston 58 to its leftmost position and apply the automobile brakes. It should be understood that the degree of braking power applied varies with the position of the piston and that varying degrees of braking power can consequently be applied by positioning handle 100 in various positions between the solid line position and the position N of FIGURE 1.

It should be noted that the brake pedal 90 can be applied at any time in the normal manner, if desired. This is true because of the lost motion connection provided in element 87.

It should also be noted that the device need not be hand operated by means of handle 100 and can easily be foot operated, if desired. When companion pedal 26 is depressed by the operator's foot, it easily pivots without interference from the hand control, due to the fact that floating link 116 is engaged to ride in slot 34. Note, for example, the respective positions of parts 28, 32 and 116, as illustrated in FIGURES 1 and 2. In FIGURE 1, the parts are in the brake-on position and in FIGURE 2 the parts are in the neutral or brake-off position and link 116 has moved within slot 34, as shown. It will also be obvious that the entire system can be disconnected without inconvenience by merely pressing knob 80 to cause valve 74 to close the vacuum line 70. Consequently, the automobile can then be operated in the normal, conventional manner without any difficulty whatsoever.

When the apparatus is operating in its automatic foot or dash control mode, removal of the operator's foot from companion pedal 26 quickly results in closure of valve 118 in an obvious manner, so that the brake is immediately applied in a much more rapid manner than would be possible without this invention. It should also be noted that the brake can be gradually applied by permitting the companion pedal to move only a slight distance away from the closed throttle position of the accelerator pedal. Different respective positions of the companion pedal are illustrated in dashed lines in FIGURE 2. This type of intermediate brake actuation is accomplished due to the balancing force on piston 58 at desired intermediate positions, as discussed previously.

In summary, this invention provides a simple and foolproof method of applying automobile brakes automatically and for controlling the automobile accelerator pedal automatically. The system can either be hand operated by handle 100 or can be foot operated by controlling pedal 26 with the operator's foot.

Obviously, many modifications and variations of the present invention are possible in light of the above teachings. It is, therefore, to be understood, that within the scope of the appended claims, the invention may be practiced otherwise than in the specific embodiment shown.

I claim:
1. An automatic brake control system for an automobile, said system comprising:
   an accelerator pedal;
   a pivotable companion pedal associated with said accelerator pedal and having means engageable with said accelerator pedal for concurrent pivotal movement therewith;
   piston means mounted for reciprocation within a cylinder;
   linkage means connecting said piston means and a brake actuator means;
   an open inlet port connected to an atmosphere on one end of said cylinder;
   vacuum line means connected between the other end of said cylinder and the intake manifold of said automobile so that a vacuum is created on the side of said piston opposite to the open inlet port so that a pressure differential is created across said piston which tends to move said piston in a first direction to move said linkage means to actuate said brake actuator means to cause the automobile brakes to be applied;
   spring means biassing said piston in an opposite direction to said first direction of movement;
   valve means comprising a poppet valve mounted for reciprocation in a coaxial piston rod connected to said piston connecting the side of said piston in communication with the end of the cylnder connected to the intake manifold with the atmosphere;
   wherein said piston rod is of sufficient length as to always extend from the end of said cylinder in which said port is located;
   a valve stem means extending from the end of said piston rod to engage a pivotable trigger means mounted on the end of said piston rod; and
   a flexible drive line connection means connected to said valve and to said companion pedal for opening said valve in response to movement of said pedal in a first direction corresponding to accelerator pedal depression so that said piston is moved by said spring mean in a first direction to terminate brake application and for closing said valve in response to movement of said companion pedal in an opposite direction so as to cause said pressure differential to move said piston and apply the brakes.

2. The device of claim 1 wherein said flexible drive line connection means comprises a first flexible line connected between a smaller diameter portion of a rotatable spool having large and smaller diameter portions and connected on its other end to said companion pedal;
   and a flexible drive line portion connected to said larger diameter portion and to said trigger means so that movement of said companion pedal causes said spool to rotate and provide a commensurately increased movement of said second flexible drive line portion connected to said trigger means.

3. The device of claim 2 wherein said linkage means connecting said piston means and said brake actuator means include lost motion means to enable said brake actuator to be independently actuated.

4. The device of claim 2 wherein said companion pedal comprises an elongated pivotable plate mounted adjacent said accelerator pedal and the means engageable with said accelerator pedal includes a laterally extending abutment plate which extends from said companion pedal and engages said accelerator pedal when said elongated plate is pivoted toward said accelerator pedal and which remains in engagement for the entire extent of travel of said accelerator pedal and additionally including spring bias means to normally bias said companion pedal away from said accelerator pedal when said accelerator pedal is in closed throttle position and wherein said flexible drive line components are mounted so that movement of said companion pedal away from said accelerator pedal causes said valve to open so as to move said piston and apply said brakes.

5. The device of claim 4 additionally including hand operable lever means connected to said companion pedal for pivotally moving said companion pedal through its entire arc of travel to provide for manual hand operation of bath said accelerator pedal and said brake applying means.

References Cited
UNITED STATES PATENTS

| | | |
|---|---|---|
| 1,721,290 | 7/1929 | Badertscher. |
| 2,643,746 | 6/1953 | Righter. |
| 2,877,880 | 3/1959 | Peebles et al. |
| 3,127,966 | 4/1964 | Sheriff et al. _____ 192—3 |
| 3,387,455 | 6/1968 | Eggstein _____ 91—376 XR |

BENJAMIN W. WYCHE III *Primary Examiner.*

U.S. Cl. X.R.
74—482; 91—422